(12) United States Patent
Hesley et al.

(10) Patent No.: US 6,489,947 B2
(45) Date of Patent: *Dec. 3, 2002

(54) ERGONOMIC DUAL-SECTION COMPUTER-POINTING DEVICE

(75) Inventors: William P. Hesley, San Jose, CA (US); Scott W. Summit, San Francisco, CA (US); Kenneth D. Boetzer, Scotts Valley, CA (US)

(73) Assignee: ErgoDevices Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,771

(22) Filed: Jul. 28, 1998

(65) Prior Publication Data

US 2002/0084985 A1 Jul. 4, 2002

Related U.S. Application Data

(63) Continuation-in-part of application No. 08/912,882, filed on Aug. 15, 1997, now Pat. No. 5,865,405, and application No. 08/912,277, filed on Aug. 15, 1997, now Pat. No. 5,868,365, and application No. 08/911,960, filed on Aug. 15, 1997, now Pat. No. 5,868,404.

(51) Int. Cl.[7] ................................. G09G 5/08
(52) U.S. Cl. ................ 345/163; 345/157; 248/118
(58) Field of Search ..................... 345/163, 157, 345/156, 158, 161, 165, 166, 167; 248/118, 118.1–118.3; 341/20, 23

(56) References Cited

U.S. PATENT DOCUMENTS 5,311,210 A * 5/1994 O'Brien et al. ............. 345/168
5,433,407 A * 7/1995 Rice ........................ 248/118.1
5,555,894 A * 9/1996 Doyama et al. ............ 345/163

(List continued on next page.)

OTHER PUBLICATIONS

"Whale Mouse, Products for the Hand," Erogview Technologies, http://www.erogview.com/prod_hands_wm.html, 2 pages, Copyright 1998.

(List continued on next page.)

Primary Examiner—Bipin Shalwala
Assistant Examiner—Mansour M. Said
(74) Attorney, Agent, or Firm—Gunnison, McKay & Hodgson, L.L.P.; Forrest Gunnison

(57) ABSTRACT

An ergonomic dual-section computer-pointing device, that includes a cursor control section fixedly and movably attached to an ergonomic hand support section, reduces stress and helps to prevent cumulative trauma disorder. The ergonomic dual-section computer-pointing device keeps the hand in a neutral position, which imitates the natural roll of the hand, the wrist and the forearm. The ergonomic dual-section computer-pointing device facilitates two fields of motion. In a first field of motion, the fingers, the hand, and the wrist are used to manipulate the cursor control section while the ergonomic hand support section remains substantially stationary. In a second field of motion, the arm and shoulder are used to move the cursor control section and ergonomic hand support section in unison. The cursor control section is fixedly and movably attached to the ergonomic hand support section by a coupler. The fixed attachment permits the cursor control section to move freely within an opening over the first field of motion. When the cursor controlled by movement of the cursor control section must be moved further than is permitted within the first field of motion, the user grasps the cursor control section, and effortlessly slides the combination of the ergonomic hand support section and cursor control section around the work surface using the arm and shoulder muscles while maintaining the hand, wrist and forearm in the neutral position.

18 Claims, 10 Drawing Sheets

U.S. PATENT DOCUMENTS

| | | | | |
|---|---|---|---|---|
| 5,805,142 A | * | 9/1998 | Byrne | 345/163 |
| 5,826,842 A | * | 10/1998 | Paulse et al. | 248/118.1 |
| 5,841,425 A | | 11/1998 | Zenz | 345/163 |
| 5,913,497 A | * | 6/1999 | Myers | 248/118.5 |
| 6,005,553 A | | 12/1999 | Goldstein et al. | 345/163 |
| 6,065,138 A | * | 5/2000 | Gould et al. | 714/47 |
| 6,124,846 A | * | 9/2000 | Goldstein et al. | 345/163 |
| 6,157,370 A | * | 12/2000 | Kravtin et al. | 345/163 |

OTHER PUBLICATIONS

"Whale," Humanscale, *http://www.humanscale.com/products/workspace/mousing_main.htm* 2 pages, Date unknown.

Form PCT/ISA/210 (Second sheet), International Application PCT/US99/31123, 1 page, May 2, 2000.

* cited by examiner

ERGONOMIC DUAL-SECTION COMPUTER-POINTING DEVICE

RELATED APPLICATIONS

This application is a continuation-in-part of and commonly assigned U.S. patent application Ser. No. 08/912,277, entitled "AN ERGONOMIC HAND SUPPORT FOR A COMPUTER POINTING DEVICE," of William P. Hesley, filed on Aug. 15, 1997, now U.S. Pat. No. 5,868,365; U.S. patent application Ser. No. 08/912,882, entitled "A METHOD FOR GUIDING PLACEMENT OF A USER'S HAND ON A HAND SUPPORT DEVICE FOR A COMPUTER POINTING DEVICE, " of William P. Hesley, filed on Aug.15, 1997, now U.S. Pat. No. 5,865,405; and U.S. patent appliction Ser. No. 08/911,960, entitled "A METHOD FOR FACILITATING MULTIPLE FIELDS OF MOTION IN USING A COMPUTER POINTING DEVICE," of William P. Hesley, filed on Aug. 15, 1997, now U.S. Pat. No. 5,868,404, each of which is incorporated herein by reference in its entirety.

BACKGROUND OF THE INVENTION

1. Field of the Invention

The invention generally relates to devices for minimizing work-related injuries caused by the use of computers, and more particularly relates to ergonomic computer-pointing devices such as an ergonomic computer mouse.

2. Description of Related Art

It is well known that the extended use of a computer-pointing device, such as a computer mouse, can cause a computer user to suffer from cumulative trauma disorder (CTD) or repetitive strain injuries (RSI). Computer users are often afflicted with pains in the hands and the wrists caused by excessive wrist movements such as flexion and hyperextension of the wrist. Computer users can also suffer from soreness and fatigue in the shoulders and the neck due to excessive arm and shoulder motions associated with use of computer-pointing devices.

Long period of repetitive motion associated with the use of the computer mouse coupled with incorrect hand posture while using the mouse may cause disorders in the hand, wrist, elbow, shoulder, and neck, such as carpal tunnel syndrome. Carpal tunnel syndrome is the numbness, tingling and loss of strength of the hand and wrist, and is caused by stress on the wrist induced by repetitive wrist and finger motions. Repetitive stress injuries, such as carpal tunnel syndrome, can be disabling and are costly, in terms of both medical expenses and lost work time.

The prior art includes several support devices that were used in conjunction with the computer pointing device, such as a computer mouse, to reduce the stress and risk of injury associated with the frequent and repetitive motion necessary in the use of the computer mouse. As described more completely below, typical support devices include stationary or movable apparatus supporting the hand, the wrist or the palm.

U.S. Pat. No. 5,451,020 to Smith et al. and U.S. Pat. No. 5,228,655 to Garcia et al. disclose examples of stationary wrist support devices, also called wrist rests. Wrist rests are typically pads placed in front of the keyboard or the mouse. The height of the pad is selected to support the wrist to elevate the hand to be level with the forearm. Wrist rests alleviate the stress on the wrist by avoiding prolonged bending up and down of the wrist. However, studies have shown that pressure on the underside of the wrist can irritate wrist tissue and increase the risk of carpal tunnel syndrome. Furthermore, wrist rests do not protect the wrist from excessive side-to-side bending, which can cause injuries to the tendons in the wrist. Thus, stationary wrist rests are not a satisfactory means to protect computer users from repetitive stress injuries.

Other types of stationary support devices include a palm rest disclosed in U.S. Pat. No. 5,433,407 to Rice, and a computer mouse support having an upwardly inclined orientation disclosed in U.S. Pat. No. 5,203,845 to Moore.

Prior art support devices also include movable apparatus. U.S. Pat. No. 5,490,647 to Rice discloses an example of a movable hand support also called a palm rest. Movable palm rests such as that disclosed by the Rice '647 patent tend to fall over easily during use and at best support the palm indirectly.

U.S. Pat. No. 5,340,067 to Martin et al. discloses a movable hand and wrist support 110 for computer mouse 112 as shown in FIG. 1. Support 110 holds mouse 112 within a retainer 114. The user rests hand 113 on support 110 such that hand 113 is on the same plane as mouse 112.

Movable hand and wrist support 110 disclosed by Martin et al. has several disadvantages. First, support 110 has a raised area 116 near the center of support 110 intended to apply gentle pressure on the palm of hand 113. As mentioned previously in reference to palm rests, applying pressure to the center of the palm can cause carpal tunnel syndrome and is highly undesirable. Second, fine mouse movements are made more difficult because the user must move mouse 112 and support together 110. Third, support 110 does not maintain hand 113 in a neutral position because the user has to twist his/her wrist to place hand 113 on the flat surface of support 110.

In addition to the disadvantages described above, prior art support devices are not satisfactory because such devices tend to force the user to focus movement of the user's hand and shoulder in one field of motion only. Stationary palm rests restrict arm and shoulder movement, and force the user to move the wrist only in manipulating the mouse. The movable wrist/hand support disclosed by Martin et al. completely eliminates wrist motion, thereby forcing the user to move the arm and shoulder exclusively in manipulating the mouse. Extended and repetitive motions focused on either the wrist or the shoulder can cause cumulative trauma disorders.

Another problem with wrist pads is that a movable wrist pad is not easily manipulated by the user. Consequently, as the mouse is moved about, either the mouse or the movable wrist pad must be repositioned to maintain the movable wrist pad in the proper relationship to and separation from the computer mouse.

One solution to this problem has been to attach the computer mouse to the movable wrist pad using a spring loaded tether. The tether is contained in the wrist pad and is attached to the head of the computer mouse using a VELCRO fastener. VELCRO is a registered U.S. trademark of Velcro U.S.A. Inc. and is a synthetic material having complementary parts, which adhere to each other when pressed together.

This configuration has several shortcomings. First, the configuration is still a computer mouse and a wrist pad and so the configuration suffers from the same basic shortcomings as the wrist pads described above. Second, the combination does not assist the user in using different muscle groups.

In particular, if the wrist pad and the computer mouse are moved to keep the two together, only the arm and shoulder muscles are used. To avoid this the user must pull the mouse away from the wrist pad, and maintain enough pressure on both the mouse and the wrist pad to maintain the separation. This adds additional unnatural stresses on the user's hand, fingers and wrist, and causes the user to attempt to manipulate the mouse using the fingers while maintaining pressure on the wrist pad with the wrist so that is does not move. If the user lifts the wrist, the spring-loaded tether moves the wrist pad against the mouse. This combination also reduces user efficiency because each time the user reaches for the mouse, the user must apply pressure on the wrist pad, and then move the mouse a sufficient distance from the wrist pad so that the mouse can be used. All of these motions are unproductive and only add to the stresses associated with using the combination device.

Also, the VELCRO fastener is not a fixed connection and if the user simply continues to move the mouse when the tether is fully extended, the VELCRO fastener may pull loose. Finally, the combination is bulky and requires sufficient desk area to facilitate moving both the wrist pad and the computer mouse. In fact, the combination is difficult to move to another location on the desktop, and difficult to move for cleaning the desktop. Users have also indicated that the combination makes it more difficult to clean the mouse ball.

Another combination simply used a VELCRO fastener to affix a palm rest to the computer mouse. The palm rest was supported by a small square bottom that did not move easily and the palm rest put pressure on the center of the hand, which as described above is undesirable. This combination suffers from the same shortcomings as an ergonomic mouse in that the combination does nothing to encourage the user to use vary the muscle groups used in manipulating the computer mouse. In fact, the combination can only be moved about using the arm and shoulder muscles, which can result in elbow and other injuries. Also, this combination makes fine control of the cursor, which is normally done using the fingers, extremely difficult.

To eliminate the problems with the various support devices, many manufacturers are changing the shape of the single unit computer mouse and some are including a larger area for hand and palm support. The intention is to cause the user to align the hand and wrist in the neutral position while grasping the mouse. While aligning the hand and wrist in a neutral position is desirable, the alignment alone is not sufficient to assure that injuries caused by repetitive use of only certain muscle groups are eliminated.

Accordingly, there is a need for a computer-pointing device, such as a computer mouse, which can reduce stress and help to prevent injuries while not impeding the productivity of the computer user.

SUMMARY OF THE INVENTION

According to the principles of this invention, an ergonomic dual-section computer-pointing device, that includes a cursor control section fixedly and movably connected to an ergonomic hand support section, reduces stress and helps to prevent cumulative trauma disorder. The ergonomic dual-section computer-pointing device does not compromise the productivity of a computer user. For example, the ergonomic dual-section computer-pointing device facilitates the user moving his/her hand from a computer keyboard to a proper position with respect to the computer-pointing device without looking at the computer-pointing device, or having to reposition any part of the device to obtain a proper relationship between the sections of the device. Therefore, delays associated with interpreting work and visually seeking the location of the computer-pointing device, or in repositioning a part of the device so that the device can be used are greatly reduced or eliminated.

The ergonomic dual-section computer-pointing device of the invention keeps the hand in a neutral position which imitates the natural roll of the hand, the wrist and the forearm, and therefore minimizes stress and fatigue while using the computer-pointing device. In addition, the ergonomic dual-section computer-pointing device positions the hand in the same plane and as close as possible to the cursor control section which in turn allows the user to easily manipulate the computer-pointing device of this invention.

The ergonomic dual-section computer-pointing device is not only compact and inexpensive, but also is adaptable to an existing desktop and does not take up too much desktop space. Hence, the ergonomic dual-section computer-pointing device of this invention overcomes the shortcomings of the prior art hand support devices, and ergonomic computer-pointing devices described above.

A significant ergonomic feature of the ergonomic dual-section computer-pointing device is that the device facilitates two fields of motion. In a first field of motion, the fingers, the hand, and the wrist are used to move the computer-pointing device of this invention, and in a second field of motion, the arm and shoulder are used to move the computer-pointing device. The two fields of motion inhibit excessive use of a particular muscle group, which in turn reduces the likelihood of injury associated with repetitive stresses and motions of that particular muscle group.

Specifically, in the first field of motion, the fingers, the hand, and the wrist are used to manipulate the cursor control section while the ergonomic hand support section remains substantially stationary. In a second field of motion, the arm and shoulder are used to move the cursor control section and the ergonomic hand support section in unison. Hence, the two fields of motion inhibit excessive use of a particular muscle group, which in turn reduces the likelihood of injury.

When a user extends a hand to the ergonomic dual-section computer-pointing device, the ergonomic hand support section guides the hand into the proper position for using the cursor control section, and guides the hand into a neutral position so that the hand, wrist, and forearm are in the same natural alignment as when the palm of the hand rests naturally on a flat surface.

As indicated above, the cursor control section of this invention is fixedly and movably connected to the ergonomic hand support section. Specifically, a coupler fixedly and movably attaches the cursor control section to the ergonomic hand support section. The fixed attachment permits the cursor control section to move over the first field of motion. Specifically, the coupler allows the user to move the cursor control section until the cursor control section contacts a control point of the ergonomic dual-section computer pointing device. In one embodiment, the control points are internal to the device, which means that the control points are defined by the coupling mechanism. In another embodiment, the control points are a combination of internal control points and external control points. In this embodiment, the internal control points are defined by the coupling mechanism, and the external control points are defined by a surface of the ergonomic hand support section and a surface of the cursor control section.

In either an internal embodiment, or a combination of an internal and external embodiment, when a control point is contacted, the user is alerted that the range of fine movement is reached and the user must employ the second field of motion to move the cursor control section further in that direction. In this manner, the ergonomic dual-section computer-pointing device inhibits excessive side-to-side bending of the user's wrist and inhibits excessive use of only one group of muscles.

When the cursor controlled by movement of the cursor control section must be moved further than is permitted within the first field of motion, the user grasps the cursor control section, and effortlessly slides the combination of the ergonomic hand support section and cursor control section around the work surface using the arm and shoulder muscles while maintaining the hand, wrist and forearm in the neutral position.

The ergonomic hand support section includes a first surface e.g., a top surface that in turn includes a palm support region. A little-finger support region extends from the palm support region. A thumb support region also extends from the palm support region. The thumb support region and the little-finger support region are positioned with respect to the palm support region so that when a user's palm rests on the palm support region, the user's little finger curls in a neutral manner about the device, and the thumb can grasp the cursor control section, i.e., the little finger and thumb are in a natural ergonomic position for the palm resting on a flat surface.

Hence, the thumb support region and the little-finger support region are ergonomically positioned with respect to the palm support region. In one embodiment, to facilitate the ergonomic positioning of the hand, the palm support region has a slope in a direction from the little-finger support region to the thumb support region.

In addition to the ergonomic positioning, in the embodiment that utilizes a combination of external and internal control points, the thumb support region and the little-finger support region define an opening positioned between the thumb support and little-finger support regions. Hence, a position of the thumb support region and a position of the little-finger support region also are selected to provide a size of the opening to permit the cursor control section have a desired range of motion within the opening. The opening has a shape similar to a portion of the cursor control section positioned in the opening, but the opening is larger than a head portion of the cursor control section thereby permits a limited range of movement of the cursor control section within the opening.

The ergonomic hand support section has a second surface, opposite and removed from the first surface, and a perimeter surface connecting the first surface to the second surface. A portion of the perimeter surface, that bounds the opening and that is between the thumb support region and the little-finger support region, is a control surface.

As the user manipulates the cursor control section within the opening, the computer-pointing device may contact a point on the control surface. A point of contract between the computer-pointing device and the control surface defines an external control point for the first field of motion. Hence, the control surface, between the finger and thumb support regions, has one or more external control points that confine the range of movement of the cursor control section in the first field of motion.

In addition to the ergonomic features, the ergonomic dual-section computer-pointing device improves the efficiency of the user by eliminating the need to look at the device when placing a hand on the device. As the user's hand moves over the ergonomic hand support device, one or more tactile indices provide tactile reference points for properly positioning the hand with respect to the computer-pointing device. In one embodiment, a combination of the first and second tactile indices is what permits the user to properly position the user's hand on the device without looking at the device.

In general, the first and second tactile indices can be placed at any location on the first surface of the ergonomic hand support section that does not interfere with the natural positioning of the hand and wrist; that does not place unnatural pressures or stresses on the hand and wrist; and that guides the hand into the proper position with respect to the computer-pointing device. The two tactile indices on the first surface are separated from each other and orientated at an angle with respect to each other in one embodiment. The angle is selected to ergonomically position the hand with respect to the computer-pointing device.

In another embodiment, the two tactile indices are placed along opposite sides of the hand support device so that one extends from the thumb and palm support regions, and the other extends from the little finger and palm support regions. Further, a tactile index may extend only along a part of a side of the hand support device. Thus, the tactile indices may be diagonally separated across the surface of the hand support device. When the indices extend along the two sides of the hand support device, there may be a small angle between the two indices, but in this case, the indices are said to be substantially parallel.

In one embodiment, a first tactile index is a side index extending from the thumb support region and the palm support region. The second tactile index is a front index extending from a portion of the palm support region between the little-finger support region and the thumb support region. The side index is shaped to push a user's hand toward the computer-pointing device. The front index is positioned so that no pressure is exerted on a center of a user's palm resting on the ergonomic hand support device.

The first surface of the ergonomic hand support section also has a pressure relief edge surface extending from a portion of the palm support region opposite and removed from the opening to a portion of the perimeter surface. In one embodiment, the pressure relief edge surface is a convex surface.

In one embodiment, the second surface of the ergonomic hand support section has a plurality of rails affixed thereto. The plurality of rails permits smooth movement of the ergonomic dual-section computer-pointing device off and on any edge of the working surface. Each of the plurality of rails has a sliding surface and a beveled edge surface. The beveled edge surface surrounds the sliding surface and extends from the sliding surface to the second surface.

Thus, an ergonomic computer-pointing device of this invention has a cursor control section, an ergonomic hand support section, and a coupler interconnecting the cursor control section and the ergonomic hand support. The coupler movably and fixedly connects the cursor control section to the ergonomic hand support section to permit free movement of the cursor control section over a first field of motion while the ergonomic hand support section remains substantially stationery. However, the coupler limits a range of motion in a first direction in the first field of motion.

In one embodiment, the device of this invention also includes a pressure timing circuit coupled to the ergonomic hand support section. The pressure timing circuit measures an amount of time a user maintains pressure on the ergonomic hand support section and generates a time-out signal when the amount of time exceeds a predefined time.

The time-out signal is used to generate a warning to the user indicating that the user has maintained contact with the device of the invention for the predefined time. The warning can be generated by circuitry on-board the computer pointing device or alternatively, by a computer to which the computer pointing device is coupled. The pressure warning circuitry of this invention can be incorporated in any computer pointing device, or alternatively in any hand or wrist support.

In one embodiment, the coupler is a telescoping mechanism pivotally connected to the cursor control section and pivotally connected to the ergonomic hand support section. A set of crash stops is mounted in one or both of the ergonomic hand support section and the cursor control section about the telescoping mechanism to limit movement of the telescoping mechanism.

In another embodiment the coupler includes a cam opening oriented about a crash stop. A size of the cam opening and a size of the crash stop determine a range of motion in the first field of motion.

BRIEF DESCRIPTION OF THE DRAWINGS

In the Figures, objects with the same reference numeral are the same object. Also, the Figures are not drawn to scale, and the characteristics described in the specification should be used to determine the relative characteristics of features of the invention.

DETAILED DESCRIPTION

According to the principles of this invention, an ergonomic dual-section computer-pointing device 200, that includes a cursor control section 201 fixedly and movably attached to an ergonomic hand support section 210, reduces stress associated with using the device and helps to prevent cumulative trauma disorder. Ergonomic dual-section computer-pointing device 200, sometimes referred to as device 200, does not compromise the productivity of a computer user, because ergonomic dual-section computer-pointing device 200 permits the user to move his/her hand between the computer keyboard and device 200 smoothly without looking at device 200.

Ergonomic dual-section computer-pointing device 200 keeps the hand in a neutral position, which imitates the natural roll of the hand, the wrist and the forearm, and thereby minimizes stress and fatigue normally associated with using a computer-pointing device. As reported by D. Rempel, P. Keir, W. Smutz and A. Hargens, "Effects of Static Fingertip Loading on Carpel Tunnel Pressure," *Journal of Orthopaedic Research*, Vol. 15, pp. 422-426, which is incorporated herein by reference to demonstrate the level of skill in the art, a neutral position is a position without an angle of extension, without an angle of flexion, and without an angle of wrist deviation, i.e., a position in which no stresses are introduced by the positioning of the fingers, hand and wrist.

Ergonomic dual-section computer-pointing device 200 also positions the hand in the plane of device 200 which in turn allows the user to easily manipulate cursor control section 201 of device 200. Ergonomic dual-section computer-pointing device 200 is not only compact and inexpensive, but also is adaptable to an existing desktop and does not take up too much desktop space.

A significant ergonomic feature of ergonomic dual-section computer-pointing device 200 is that device 200 facilitates two fields of motion. As explained more completely below, in a first field of motion, the fingers, the hand, and the wrist are used to manipulate cursor control section 201 while ergonomic hand support section 210 remains substantially stationary. In a second field of motion, the arm and shoulder are used to move cursor control section 201 and ergonomic hand support section 210 in unison. Hence, the two fields of motion inhibit excessive use of a particular muscle group, which in turn reduces the likelihood of injury.

Figure 2A:
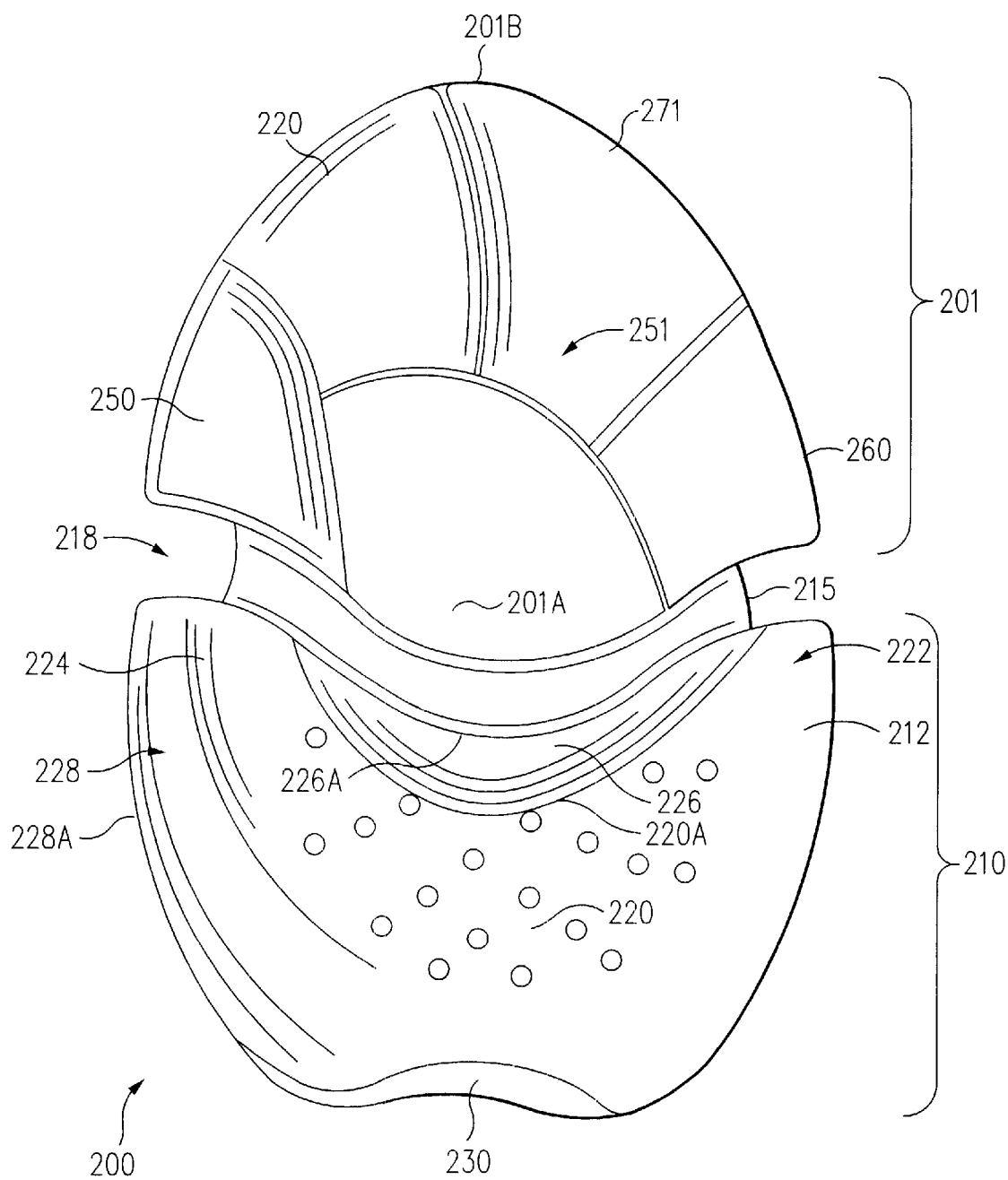
FIG. 2A is a top view of an ergonomic dual-section computer-pointing device in accordance with the present invention.
Figure 2B:
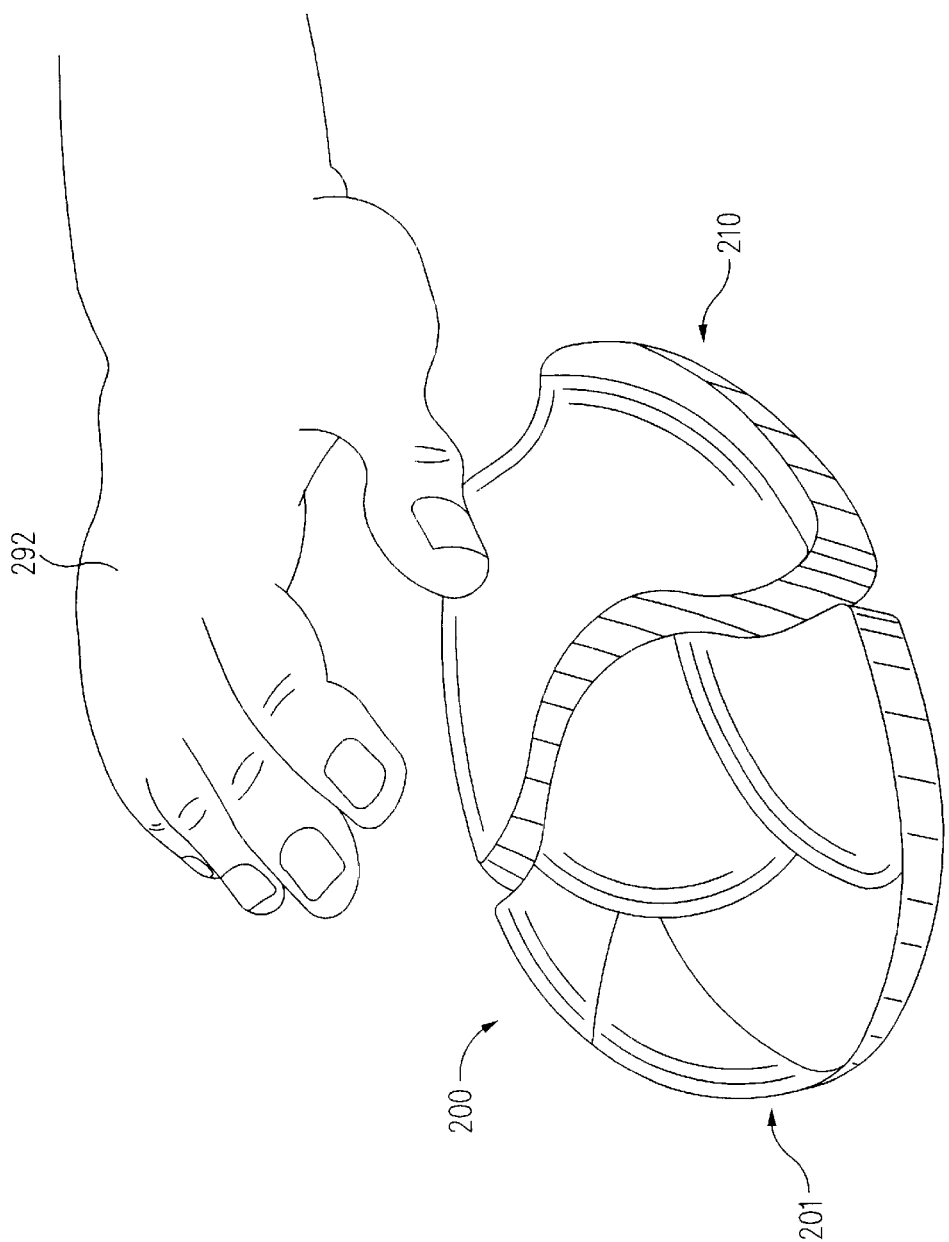
FIG. 2B is a perspective view of a user's hand being placed on the ergonomic dual-section computer-pointing device of FIG. 2A.

FIG. 2A is a top view of ergonomic dual-section computer-pointing device 200 in accordance with the present invention. When a user extends a hand to ergonomic dual-section computer-pointing device 200 (FIG. 2B), ergonomic hand support section 210 guides the hand into the proper position for using cursor control section 201, and guides the hand into a neutral position (FIG. 2C) so that the hand, wrist, and forearm are in the same natural alignment as when the palm of the hand rests naturally on a flat surface.

When the user desires to make fine cursor movements, the user keeps ergonomic hand support section 210 substantially stationary, e.g., the user does not consciously attempt to move section 210, and utilizes the fingers, the hand, and the wrist to move cursor control section 201. Hence, the user typically keeps ergonomic hand support section 210 stationary when making movements of cursor control section 201 in the first field of motion. Of course, in some situations, it is possible for the user to move ergonomic hand support section 210 slightly to make fine cursor movements as well.

Cursor control section 201 is fixedly and movably attached to ergonomic hand support section 210 by a coupler 215. The fixed attachment permits cursor control section 201 to move freely over the first field of motion. Specifically, coupler 215 allows the user to move cursor control section 201 until cursor control section 201 contacts a control point. As explained more completely below, the control points are defined as either internal control points or a combination of internal and external control points. Internal controls are defined by the coupling mechanism between cursor control section 201 and ergonomic hand support section 210. A combination of internal and external control points are defined by the coupling mechanism, the shape of head portion 201A of cursor control section 201 and the shape of opening 218.

When a control point is contacted, the user is alerted that the range of fine movement is reached and the user must employ the second field of motion to move cursor control section 201 further in that direction. In this manner, ergonomic dual-section computer-pointing device 200 inhibits excessive side-to-side bending of the user's wrist, and inhibits excessive use of only one group of muscles.

When the cursor controlled by movement of cursor control section 201 must be moved further than is permitted within the first field of motion, the user grasps cursor control section 201, and effortlessly slides the combination of ergonomic hand support section 210 and cursor control section 201 around the work surface using the arm and shoulder muscles while maintaining the hand, wrist and forearm in the neutral position.

Ergonomic dual-section computer-pointing device 200 facilitates synchronized movement of ergonomic hand support section 210 and cursor control section 201 over the second field of motion. The displacements, which can be accomplished through motion of both ergonomic hand support section 210 and cursor control section 201 using the arm and shoulder muscles, define the second field of motion.

As described above, device 200 guides the user's hand into the proper position without requiring the user to look at device 200. This feature is provided by a side index 228, a first tactile index, that is immediately adjacent a thumb support region 224 and a palm support region 220 on a first surface 212, sometimes called top surface 212, of ergonomic hand support section 210. As the user's hand moves over ergonomic dual-section computer-pointing device 200, side index 228 provides a first tactile reference point for properly positioning the hand on ergonomic dual-section computer-pointing device 200.

A portion 220A of palm support region 220 closest to cursor control section 201, e.g., a side of palm support region 220, is bounded by a front index 226, a second tactile index. As the user's hand moves over ergonomic dual-section computer-pointing device 200, front index 226 provides a second tactile reference point for properly positioning the hand with respect to cursor control section 201. Front index 226 provides a stop for the user's hand and is designed to place no unnatural pressure on the center of the palm, i.e., is positioned to minimize the pressure exerted on the center of the palm.

The combination of the first and second tactile reference points permits the user to properly position the user's hand on ergonomic dual-section computer-pointing device 200 without looking at device 200. However, those of skill in the art will appreciate that proper positioning could be obtained using only one of the tactile indices.

In general, the first and second tactile indices can be placed at any location on surface 212 that does not interfere with the natural positioning of the hand and wrist; that does not place unnatural pressures or stresses on the hand and wrist; and that guides the hand onto device 200.

As shown in FIG. 2A, indices 226 and 228 are separated from each other and orientated at an angle with respect to each other. The angle is selected to properly position the hand on device 200. Alternatively, indices 226 and 228 could both be placed along opposite sides of section 210 so that one extends from thumb and palm support regions 224 and 220, and the other extends from little finger and palm support regions 222, 220. (This embodiment is not illustrated, since those of skill in the art will understand how to construct an index similar in shape to index 228 along the opposite side of section 210, and so a figure is not required to understand this alternative embodiment.) Further, indices 226 and 228 may extend along only a part of a side of section 210. Thus, indices 226 and 228 may be diagonally separated across surface 212 of section 210. When indices 226 and 228 extend along the two sides of section 210, there may be a small angle between the two indices, but in this case, the indices are said to be substantially parallel.

Top surface 212 of ergonomic hand support section 210 includes yet another ergonomic feature, a pressure relief edge surface 230. Pressure relief edge surface 230 minimizes the pressure applied to the nerves, especially the median nerve, and to the circulatory system to and from the hand and the wrist when the user's hand is supported on ergonomic dual-section computer-pointing device 200.

Figure 2C:
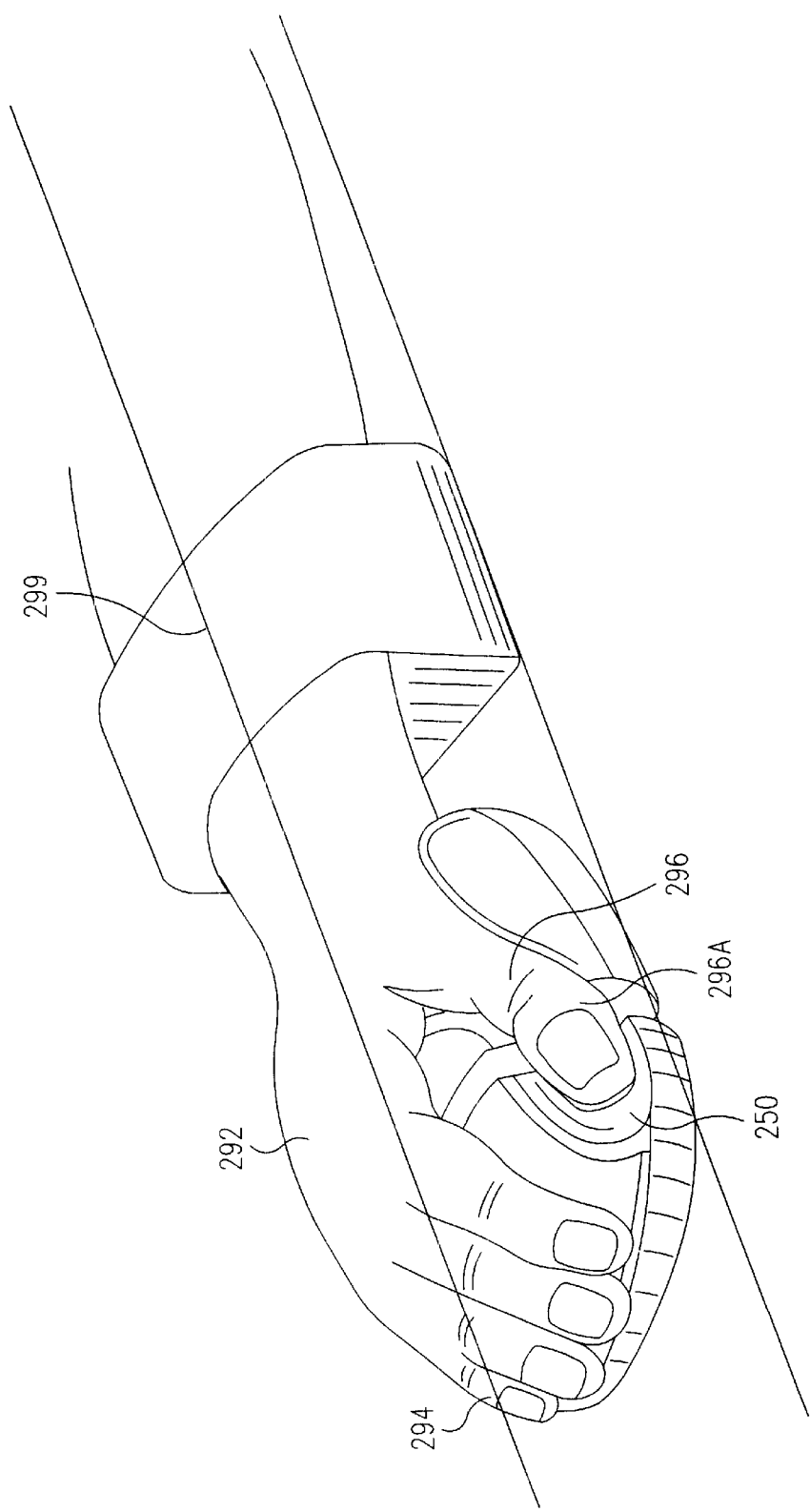
FIG. 2C is a side perspective view of the user's hand resting on the ergonomic dual-section computer-pointing device of FIG. 2A in a neutral position.

As illustrated in FIG. 2C, when hand 292 is properly placed on ergonomic dual-section computer-pointing device 200, little-finger support region 222(FIG. 2A) allows little finger 294 of user's hand 292 to curl in a relaxed position about device 200. In another embodiment (not shown), a little finger rest area, similar to thumb rest 250, is included on cursor control section 201. Alternatively, this rest area could be designed to accommodate both the little and ring fingers. Thumb support region 224 positions user's thumb 296 so that thumb tip 296A is positioned naturally in thumb rest 250 of cursor control section 201 so as to permit grasping the side of cursor control section 201.

When supported by ergonomic dual-section computer-pointing device 200, user's hand 292 is in its neutral position, and on the same plane as device 200 as illustrated in FIG. 2C. Ergonomic dual-section computer-pointing device 200 also positions the user's hand 292 close to and on the same plane as cursor control section 201 to allow precise control of cursor control section 201 for fine movements. Notice that hand 292 rests directly on the upper surface of device 201 and so rests directly on the plane defined by the upper surface. Moreover, the hand, wrist and forearm are substantially aligned along a straight line 299.

Cursor control section 201 (FIG. 2A) has a concave transition from thumb rest to 250 to upper surface 251. Upper surface 251 is a convex surface that follows the shape of the fingers in the neutral position. In this embodiment, the convex surface is on a plane that slopes towards side 260, which is the side opposite to and removed from thumb rest 250. Again, the slope is chosen that the hand rests naturally on and in the plane of cursor control section 201. The convex surface can also have a slope towards tail portion 201B. Thus, upper surface 251 is a sloped curvilinear surface that supports the user's fingers in a neutral position, i.e., with the fingers slightly curved when resting on the surface of device 200. Control buttons 270 and 271 are positioned under the index and second fingers respectively.

Preferably, head portion 201A of cursor control section 201 has a shape that substantially mates with ergonomic hand support section 210. In FIG. 2A, head portion 201A mates with opening 218. The shape of opening 218 is illustrative only and is not intended to limit the invention to the particular shape illustrated. For embodiments that include only internal control points, for example, both section 201 and section 210 could have a flat mating surface.

Figure 3A:
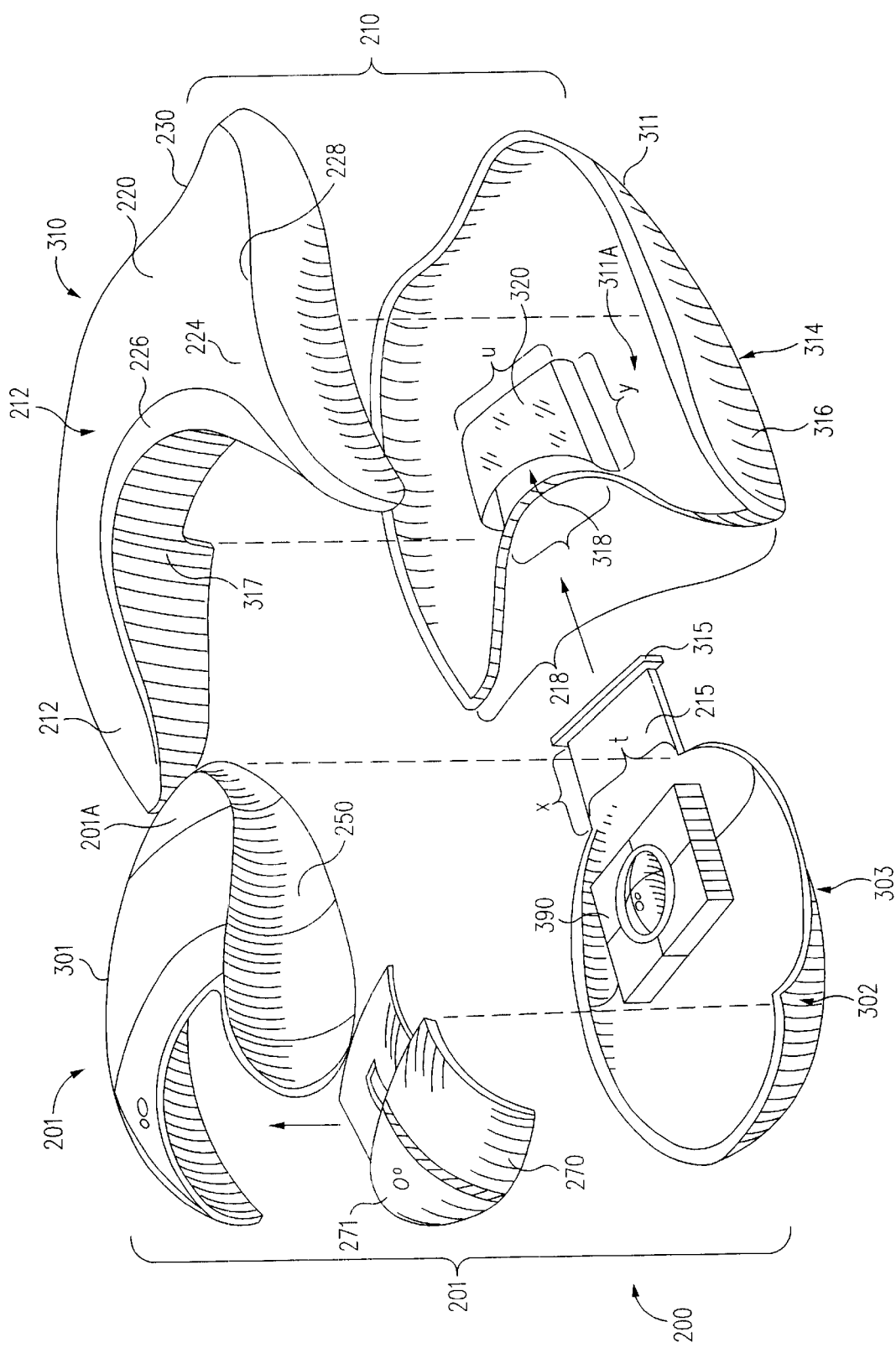
FIG. 3A is an exploded perspective view of one embodiment of the ergonomic dual-section computer-pointing device of this invention.

FIG. 3A is an exploded view of one embodiment of ergonomic dual-section computer-pointing device 200.

Ergonomic hand support section 210 has an ergonomic hand support top section 310 and an ergonomic hand support bottom section 311. Similarly, cursor control section 201 has a top cursor control section 301 and a bottom cursor control section 302. In this embodiment, coupler 215 is formed as an integral part of bottom cursor control section 302, i.e., section 302 and coupler 215 form a single piece, and coupler 215 extends from head portion 201A of bottom cursor control section 302.

Coupler 215 extends through an opening 318 formed by a coupler bracket 320, which is attached to a surface 311A of ergonomic hand support bottom section 311, and surface 311A. In this embodiment, side walls 320A and 320B are parallel to each other. Motion limiter 315, that is shown attached to coupler 215, is actually fixedly attached to coupler 215 after coupler 215 is passed through opening 318. As used herein, fixedly attached means a connection that cannot be altered by the user, and is in contrast to, for example, a VELCRO fastener.

A predefined maximum displacement of cursor control section 201 away from ergonomic hand support section 210, i.e., a predefined maximum displacement is a first direction, is the difference between length X of coupler 215 and length Y of coupler bracket 320. Similarly, the range of displacement from side-to-side is limited by the difference between width T of coupler 215 and width U of coupler bracket 320.

Table 1 presents one embodiment of a range of sizes for coupler bracket 320 and coupler 215.

TABLE 1

| Ref. Num. | Description | Minimum cm/inches | Maximum Cm/inches | Preferred cm/inches |
| --- | --- | --- | --- | --- |
| X | Coupler length | 0.84/0.33 | 12.7/5.00 | 2.54/1.00 |
| Y | Coupler bracket Length | 0.64/0.25 | 14.61/5.75 | 1.52/0.60 |
| T | Coupler Width | 0.84/0.33 | 12.7/5.00 | 3.18/1.25 |
| V | Coupler bracket Width | 1.09/0.43 | 12.45/4.90 | 2.54/1.00 |

The minimum and maximum sizes were selected to bracket the range of hand sizes from a small child's hand to a very large adult hand. The range of sizes is illustrative only and is not intended to limit the invention to the particular ranges given. In view of this disclosure, those of skill in the art can select sizes so that the neutral position is maintained as cursor control section 201 is manipulated over the first field of motion, and so that the separation between sections 201 and 210 is such that as the user positions the hand on device 200 the positioning of section 201 with respect to section 210 is such that the user can immediately begin to use device 200.

As the user manipulates cursor control section 201 with ergonomic hand support section 210 stationary, motion limiter 315 contacts coupler bracket 320 when the predefined maximum displacement in the first direction is reached, and limits further motion in that direction without moving ergonomic hand support section 210. Thus, the back surface of coupler bracket 320 is a control surface. Any point of contact between the back surface of coupler bracket 320 and motion limiter 315 is an internal control point.

When head portion 201A is moved towards ergonomic hand support section 210 and contacts control surface 317 further motion of cursor control section 201 is limited in that direction. This point of contact is an external control point.

In a motion to the side, coupler 215 contacts one of side walls 320A and 320B of coupler bracket 320. The surfaces of side walls 320A and 320B adjacent to coupler 215 are control surfaces. Any point of contact between coupler 213 and the surfaces of side walls 320A and 320B is an internal control point. Therefore, as described above, cursor control section 201 can be manipulated over a first field of motion that is bounded by the differences in length and width of coupler 215 and coupler bracket 320.

In another embodiment, side walls 320A and 320B of coupler bracket 320 are only substantially parallel. This means that opening 318 is wider at the front than at the back and so side walls 320A and 320B are not exactly parallel. In this embodiment, the range of side-to-side motion in the first field of motion is controlled by a combination of side walls 320A and 320B and control surface 317.

Figure 3B:
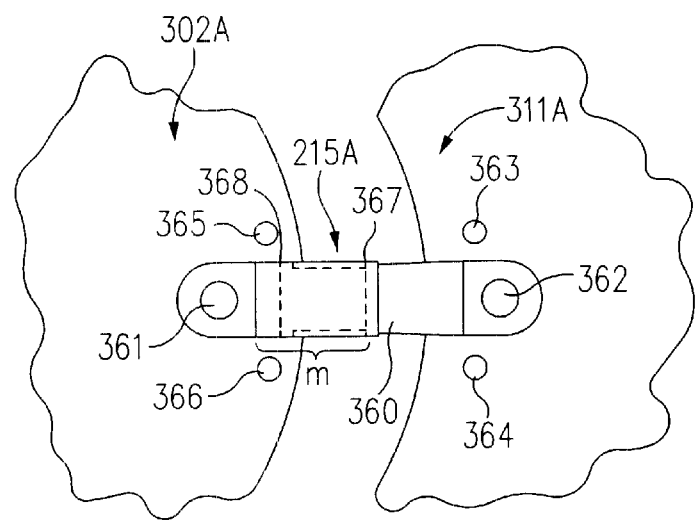
FIG. 3B is an alternative coupling mechanism for the computer-pointing device of this invention.

FIG. 3B is an illustration of an alternative coupling mechanism 215A. In this embodiment, a telescoping rod 360 is connected to a pivot 362 in ergonomic hand support bottom section 311A, and to a pivot 361 in bottom cursor control section 302A. Rod 360 has stops 367 and 368 positioned so that a length of rod 360 varies by a distance m in going from unextended to fully extended. When the movable part of telescoping rod contacts either of stops 367 and 368, an internal control point is defined. The distance between stops 367 and 368 defines a range of motion in a first direction in the first field of motion. This range is limited between unextended and fully extended positions of telescoping rod 360, which is one embodiment of a telescoping mechanism.

A set of posts 363 and 364 in ergonomic hand support bottom section 311A define the range of permitted side-to-side motion in the first field of motion, i.e., a range of motion in a second direction of the first field of motion. When telescoping rod 360 contacts a point one of posts 363 and 364, an internal control point is defined.

To relieve the stress on either of posts 363 and 364 when cursor control section 201 is moved to contact a control point, a complementary set of posts 365 and 366 are included in bottom cursor control section 302A. Those of skill in the art will appreciate that only one of the sets of posts is sufficient, and that the posts are illustrative of crash stops that are positioned in device 200 about the telescoping mechanism to define internal control points that in turn define a limit of a range of motion in the first field of motion.

For the embodiment of FIG. 3B, all the control points are internal control points. Alternatively, the sets of posts could be eliminated. In this embodiment, telescoping rod defines the range of motion in one direction, and control surface 317 the range of motion in the other direction. Consequently, the control points are a combination of internal and external control points.

Figure 3C:
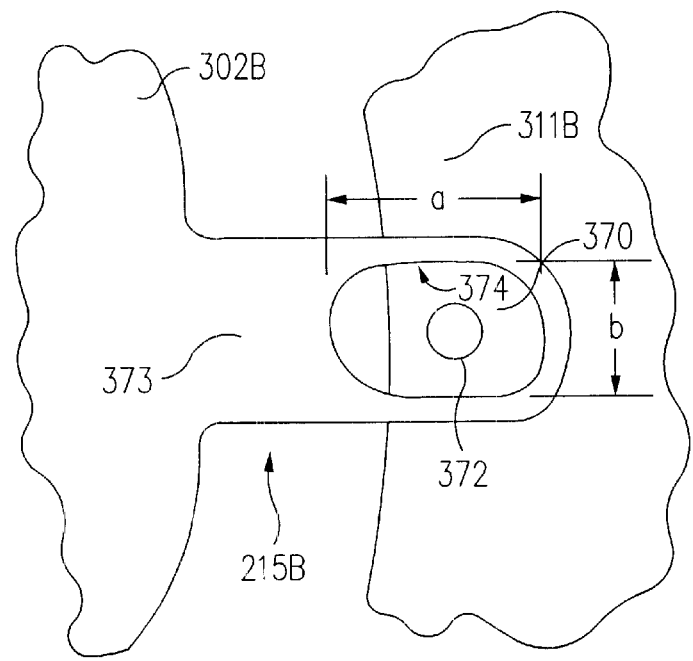
FIG. 3C is yet another alternative coupling mechanism for the computer-pointing device of this invention.

FIG. 3C is an illustration of yet another alternative coupling mechanism 215B. In this embodiment, coupler 373, that is formed as part of bottom cursor control section 302B has an internal surface 374 that bounds a cam opening 370 that is mounted over a crash stop 372 in ergonomic hand support bottom section 311B. The shape and size of cam opening 370 and the shape and size of crash stop 372 are selected to define a range of permitted motion in the first field of motion. In this embodiment, all the control points are internal control points. Specifically, a control point is a point of contact between crash stop 372 and internal surface 374.

As shown in FIG. 3C, in this embodiment, cam opening 370 is elliptical with a major axis a and a minor axis b and crash stop 372 is cylindrical with a diameter d. Major axis a minus diameter d defines the maximum displacement in the first direction. Minor axis b minus diameter d defines the maximum displacement in the second direction. In another, embodiment, the ellipse is rotated 90 degrees so that the major axis extends in the second direction and the minor axis in the first direction. Alternatively, the major axis and the minor axis could be equal so that cam opening 370 is a circle. Also, crash stop 372 could have an elliptical cross section. In general, cam opening 370 and crash stop 372 can have any desired shape so long as the combination provides a satisfactory first field of motion. For example, opening 370 could be a rectangle with rounded corners, egg-shaped, or a cone.

Irrespective of the coupling mechanism used, ergonomic dual-section computer pointing device 200 has significant advantages over the prior art. No force is required to maintain the two sections of device 200 in a particular relationship to each other. Consequently, unnatural stresses are not required to maintain a proper relationship between the two sections of the device. Sections 201 and 210 are always in a proper relationship because the coupling mechanism limits the maximum range of motion between the two sections and therefore, limits the maximum separation between the sections. Therefore, the user can simply place a hand on device 200 and is not required to reposition either of the two sections before beginning to use device 200.

Cursor control section 201 is positioned more closely to ergonomic hand support section than was previously possible with a computer mouse and a hand support while still permitting movement of control section 201. Also, the proximity of the two sections allows the fingers to move cursor control section 201 more easily and to more precisely position cursor control section 201 than was possible using a computer mouse with a hand support. Ergonomic hand support top section 310 has features and dimensions for surface 212 that are similar to those described in commonly assigned U.S. patent application Ser. No. 08/912,277, entitled "AN ERGONOMIC HAND SUPPORT FOR A COMPUTER-POINTING DEVICE," of William P. Hesley, filed on Aug. 15, 1997, which is incorporated herein by reference by its entirety. The features are also briefly described below.

Ergonomic hand support top section 310 is fixedly attached to bottom section 311. Notice that when sections 310 and 311 are attached, a cavity is formed that can house an application specific integrated circuit (ASIC) or other circuitry for other special functions that may be incorporated into mouse. Alternatively, the ASIC could be included in control section 201 or could even be built into coupler 215.

Figure 4A:
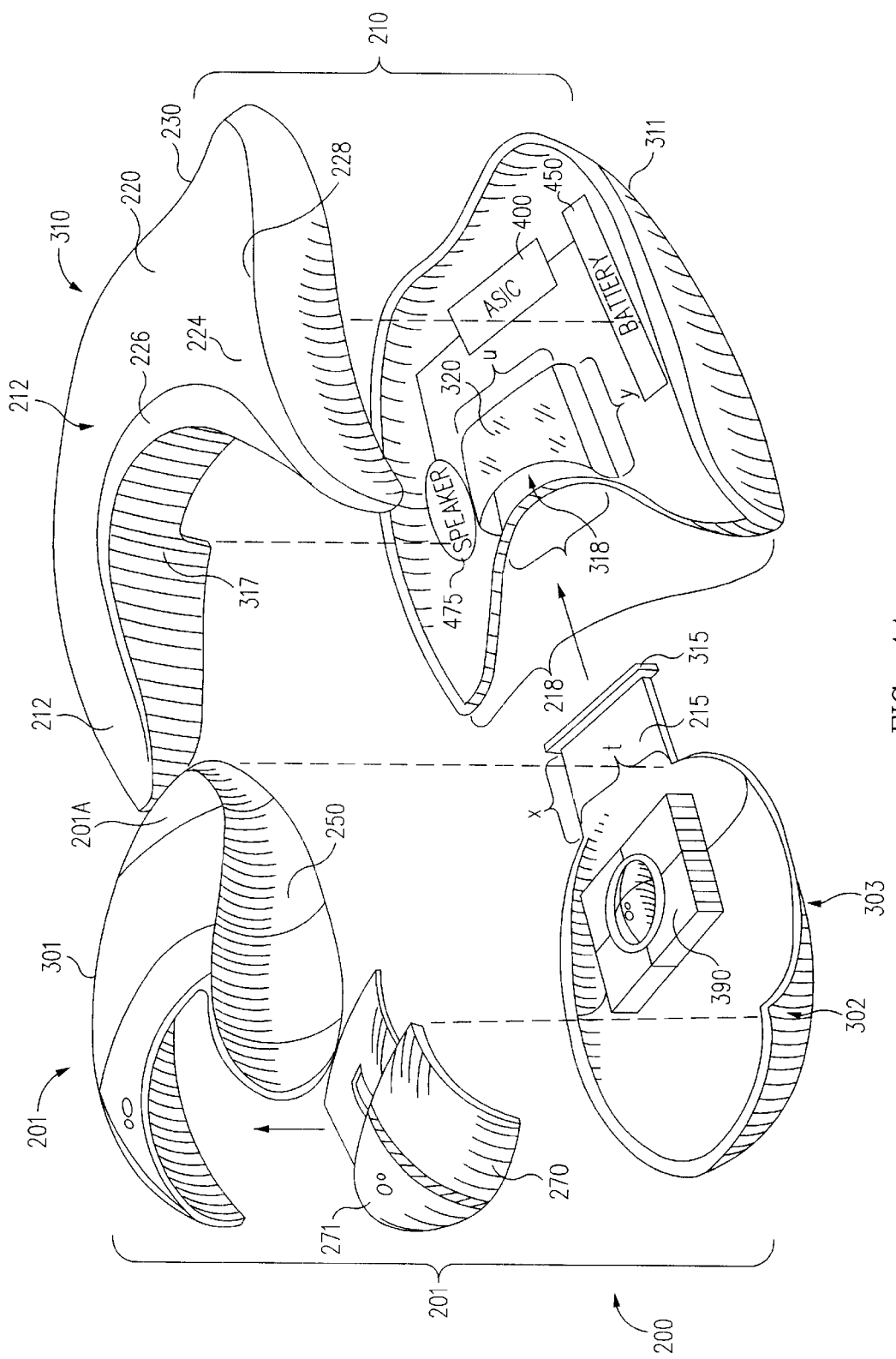
FIG. 4A is an exploded perspective view of one embodiment of the ergonomic dual-section computer-pointing device of this invention that includes an application specific integrated circuit.

In one embodiment illustrated in FIG. 4A, a pressure sensor (not shown) is mounted on inner surface (not shown) of ergonomic hand support top section 310 that is opposite and removed from palm support region 220. The signal from the pressure sensor is applied to an ASIC 400 that monitors the time the user maintains contact with palm support region 220. When this contact time is greater than a preset time, a signal is generated to a circuit that generates an audio warning for the user. The audio warning can be either a particular set of tones, or synthesized speech. For example, a message as simple as "Break Time" or as detailed as instructions on specific exercises to perform could be provided.

Figure 4B:
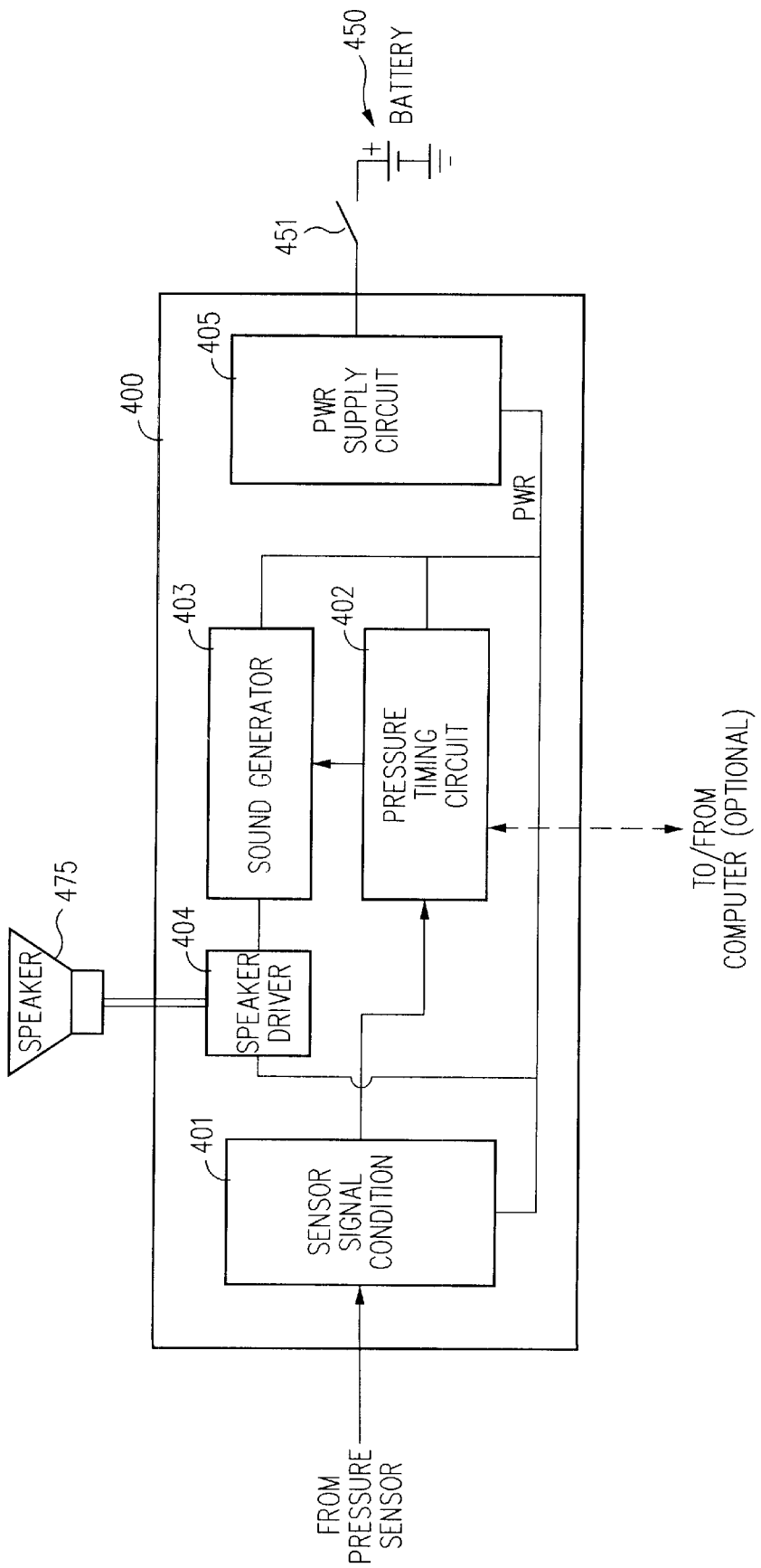
FIG. 4B is a more detailed block diagram of the application specific integrated circuit.

FIG. 4B is a block diagram of one embodiment of ASIC 400. The signal from the pressure sensor drives a sensor signal conditioning circuit 401. The operation of circuit 401 depends upon the type of sensor employed. In general, circuit 401 converts the signal from the pressure sensor into a logic one to indicate that there is hand pressure on section 220 or a logic zero to indicate that there is no hand pressure on section 220. The output signal from circuit 401 is an input signal to pressure timing circuit 402.

Figure 5:
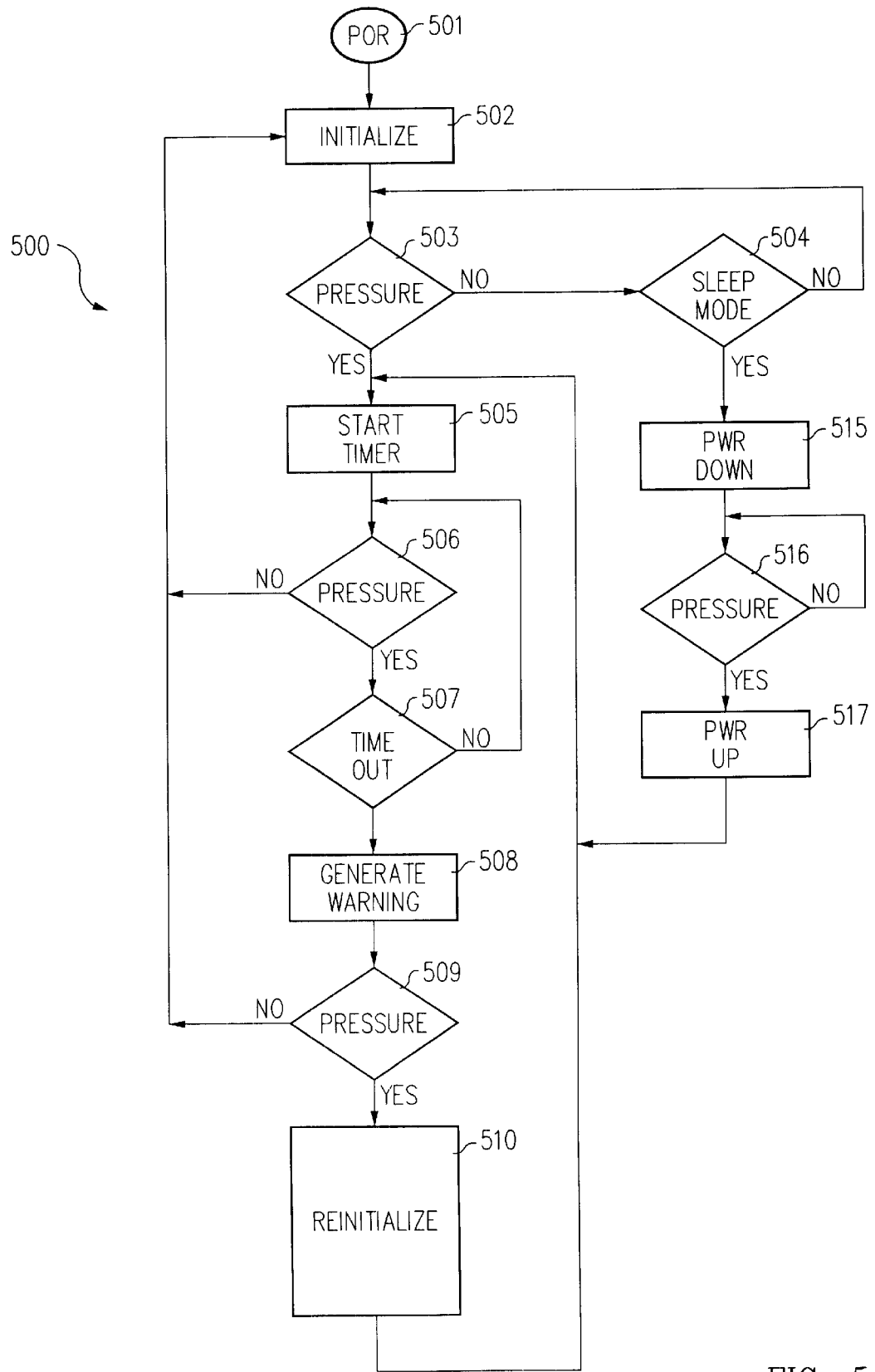
FIG. 5 is a process flow diagram of one embodiment of a pressure timing circuit that is included in the application specific integrated circuit of FIGS. 4A and 4B.

Process flow diagram 500 (FIG. 5) is one embodiment of the operations performed by pressure timing circuit 402. A power-on-reset 501 starts process 500 by transferring to an initialize operation 502. The power-on-reset signal can be generated, for example, by closing switch 451.

Initialize operation 502 sets a pressure timer to a first predefined time period, e.g., a maximum time interval that the user should maintain pressure on palm support region 220. A sleep timer is set to a second predefined time period. This value is a time period after which further use of device 200 is not anticipated and so ASIC 400 can be put into a sleep mode, i.e., a power-saving mode to preserve battery 450. Finally, a flag is set to indicate the message that is to be played upon expiration of the first predefined time period. Initialize operation 502 transfers to pressure check 503.

Pressure check 503 samples the signal from circuit 401. If the signal is false, check 503 transfers to sleep mode check 504. Conversely, if the signal is true, check 503 transfers to start timer operation 505.

Start timer operation 505 starts the pressure timer, and transfers to pressure check 506. If the signal from circuit 401 is still true, check 506 transfers to time-out check 507 and otherwise to initialize operation 502.

Time-out check 507 is false except when the pressure timer times out. Thus, if the pressure timer has not timed out, time-out check 507 returns to pressure check 506. Thus, checks 506 and 507 maintain an idle state until the first to occur of the user removing pressure from palm support region 220, or the user maintaining pressure on palm support regions 220 for the first predefined time interval, i.e., process 500 remains in an idle state until one of a plurality of predefined events occurs.

If the user removes pressure prior to the end of the first predefined time interval, circuit 402 effectively resets and starts the monitoring process over with initialize operation 502. Conversely, if the user maintains pressure for the first predefined time interval, time out check 507 transfers to generate warning operation 508.

Generate warning operation 508 generates an enable signal to sound generator circuit 403, and in this embodiments provides a message selection signal corresponding to the flag that is active. The flag indicates the message, or tones that are to be played. At this point in process 500, the flag set during initialize operation 502 is active and so a message selection signal is applied to sound generator 403 to play the basic message. In response to the enable and message selection signals, sound generator 402 provides the indicated message to speaker driver circuit 404 that in turn drives speaker 475.

While in this embodiment, sound generator circuit 403 is shown as a part of ASIC 400, this is illustrative only of the principles of this invention. Those of skill in the art will appreciate that circuit 403 could be a separate circuit and memory that could include for example a digital signal processor and random access memory. Therefore, the illustration in FIG. 4B is not intended to limit the invention to the particular embodiment illustrated.

In pressure timing circuit 402, generate warning operation 508 transfers to pressure check 509. If after hearing the warning message, the user maintains pressure on palm support region 220 processing transfers to re-initialize timer operation 510 and otherwise to initialize operation 502.

The functions performed in re-initialize timer operation 510 can be structured in a number of ways. The purpose is to provide a means for reinforcing the warning already given. In one embodiment, a look-up table is provided and the current value of the flag is used as a pointer to a row in the table. The first value in a row is another time interval that is loaded into the pressure timer, and a second value in the row is a new value that is assigned to the flag. In one embodiment, the time intervals stored in the look-up table decrease, and the severity of the warning increases. Hence, re-initialize timer operation 510 configures ASIC 400 to generate another warning after the time interval loaded into the pressure timer from the look-up table expires. Re-initialize timer operation returns to start timer operation 505.

Operations 505 to 510 are repeated until the user removes pressure from palm support region 220, and initialize operation 502 resets the pressure time, the sleep timer and the flag. If no pressure is applied to region 220 before the sleep timer times out, sleep mode check 504 transfers to power down operation 515. Power down operation 515 sends a power down signal to power supply circuit 405, which in turn powers down all circuitry except that required to detect a change in the signal from the pressure sensor. Power down operation 515 transfers to pressure check 516.

Circuit 402 remains in pressure check 516 until the signal from pressure sensor changes. In response to the signal change, pressure check 516 transfers to power up operation 517.

Power up operation 517 brings all the circuitry up to the full-power state and transfers to start timer operation 505.

The above description included several operations that could be eliminated and still provide an acceptable level of functionality. For example, sleep operations 504, 515, 516, and 517 could be eliminated. Similarly, the increased severity of the warnings with decreasing time periods could be eliminated, and the modified process would simply generate the same warning every first time period for which the user maintained pressure on palm support region 220.

The method used to power ASIC 400 depends upon the configuration of the mouse. If the mouse connection to the computer permits power to be used for auxiliary circuitry, this power source would be used. Alternatively, a small battery 450 could be housed within ergonomic hand support section 210. The battery powers a power supply circuit 405 that in turn powers the other circuits in ASIC 400.

In still another embodiment, ASIC 400 is accessible by a mouse driver (a computer program) or other software driver, in the computer to which device 200 is connected. The mouse driver can be used to program the circuitry in ASIC 400 and can receive information from ASIC 400 such as the time-out signal. In this embodiment, the computer could be used to provide either an audio or a visual warning to the user in response to the time-out signal. In this case, generate warning operation 508 would be performed by the computer, and parameters loaded in initialize operation 502 would be provided by the computer.

In one embodiment, device 200 includes a microcontroller that controls the operation of ASIC 400 and that communicates with the device driver on the computer. Methods and techniques for interfacing the microcontroller, the bus from the computer to device 200, and ASIC 400 are in common use. In addition, ribbon connectors, contact slide connectors, or flexible circuit boards such as those utilized in disk drives could be used to provide an electrical coupling between cursor control section 201 and ergonomic hand support section 210 using coupler 215.

ASIC 400 provides yet another mechanism to encourage the user to maintain good ergonomic practices. Circuitry similar to that described above could be incorporated in any computer device for which ergonomic factors are a concern.

The warning function performed by ASIC 400, is only illustrative of one function that could be incorporated in device 200. Alternatively, ASIC 400 could be configured, for example, to generate entertaining sounds in response to movements of the mouse, or to generate sounds that corresponded to the acceleration of the mouse to provide audio feedback to the user.

With the exception of the physical shape of cursor control section 201 and coupler 215, components, which are associated with positioning the cursor, and with related functions performed by the mouse button, located in the cavity formed by bottom cursor control section 302 and top cursor control section 301 are conventional in one embodiment. Top cursor control section 301 is affixed to bottom cursor control section 302, and mouse buttons 270 and 271 are mounted so that buttons 270 and 271 work in a conventional fashion.

Specifically, mouse buttons 270 and 271 and tracking mechanism 390 are conventional in this embodiment, and include the same circuitry commonly found in computer mice. Since these features are well known and readily accessible by those of skill in the art, they are not described in further detail to avoid detracting from the description of the invention.

In addition, other circuitry could be included in device to provide custom cursor control and to offload some of the cursor control functions from the computer to device 200. This would improve the overall efficiency of a computer system that included device 200.

In addition, while two mouse buttons are shown in this embodiment, one or more switches that are controlled by the thumb or the fingers could be included in device 200. Further, the mouse buttons and the number of mouse buttons are illustrative only. Device 200 can include any desired combination of buttons and switches including contact switches (click switches), rocker switches, and roller switches. It is also contemplated, for example, that a contact switch could be included in thumb rest 250. The important aspect is that the placement and design of the buttons and/or switches does not add unnatural stress to the hand, fingers, or wrist in using device 200.

Those of skill in the art will appreciate that a cable (not shown) may be connected to cursor control section 201 that in turn connects buttons 270 and 271 and cursor control section 370 of device 200 to a computer. Alternatively, either an infrared transmitter or other electromagnetic wave transmitter could be housed in cursor control section 201, or in cursor control section 201 and ergonomic hand support section 210, and used to communicate with a computer.

Returning to the configuration of ergonomic hand support section 210 (FIG. 2A), side index 228 curves upwards, i.e., curves in a direction which in this embodiment is the Z-direction, from thumb support region 224 and palm support region 220, and has an upper edge surface 228A that is elevated above thumb support region 224 and palm support region 220. In this embodiment, the curvature from thumb support region 224 and palm support region 220 to upper edge surface 228A is concave.

Thumb support region 224 transitions into palm support region 220 of first surface 212 of ergonomic dual-section computer-pointing device 200, i.e., thumb support region 224 extends from palm support region 220. Front index 226 extends between thumb support region 224 and little-finger support region 222 of first surface 212.

Figure 1:
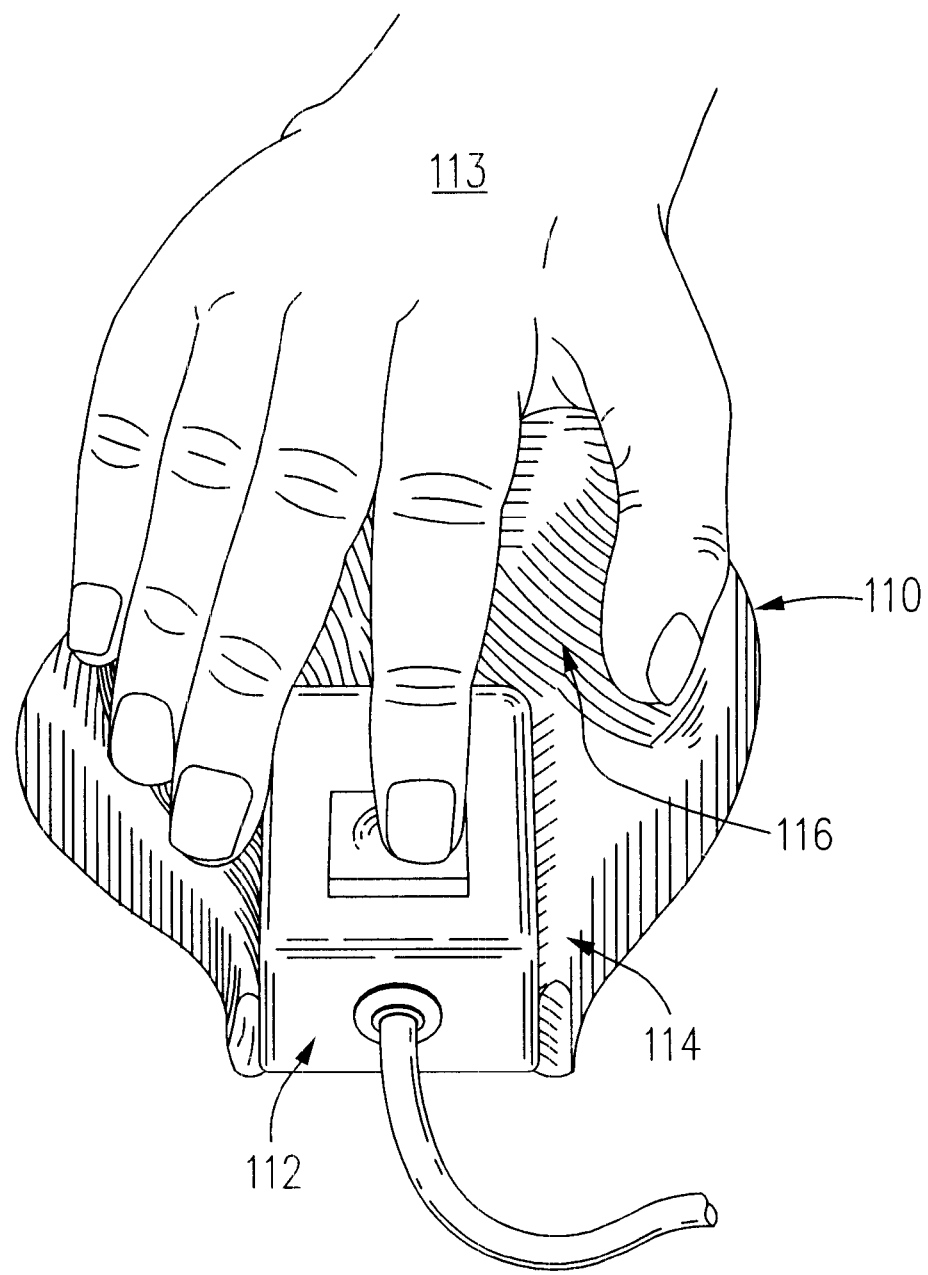
FIG. 1 is a perspective view of a prior art movable hand and wrist support for use with a computer mouse.

Front index 226 curves upwards, i.e., curves in the Z-direction, from palm support region 220, thumb support region 224, and little-finger support region 222, and has an upper edge surface 226A that is elevated above palm support region 220, thumb support region 224, and little-finger support region 222. In this embodiment, the curvature from palm support region 220 to upper edge surface 226A is convex. Unlike prior art device 110(FIG. 1), when a user's hand rests naturally on ergonomic dual-section computer-pointing device 200, front index 226 places minimal pressure on the center of the user's palm. Consequently, use of device 200 does not result in unnatural stresses being induced in the user's palm.

First surface 212 is inclined in a direction from little-finger support region 222 to thumb support region 224, i.e., is inclined in a direction that is perpendicular to the Z-direction, and in this embodiment is the X-direction. Thus, palm support region 220 is an inclined planar surface in this embodiment. The slope of the inclined planar surface is selected so that when the user's hand is placed on first surface 212 of ergonomic dual-section computer-pointing device 200, the user's hand and forearm are rolled into a neutral position that helps to minimize the stress on the user's fingers, hand, wrist, and arm.

Little-finger support region 222 and thumb support region 224 extend substantially in a direction, that is perpendicular to the Z- and X-directions from palm support region 220. In one embodiment, regions 222 and 224 define opening 218 that frames head portion 201A of cursor control section 201. Head portion 201A of cursor control section 201 is the portion of section 201 removed from buttons 270 and 271. However, if no external control points for side-to-side motion are needed, opening 218 can be eliminated so that surface 317 becomes a substantially planar surface.

Ergonomic hand support section 210 has a second surface 314 (FIG. 3), sometimes called bottom surface 314, which is opposite and removed from first surface 212 in the Z-direction. Ergonomic hand support section 210 also has a perimeter surface 316 joining first surface 212 and second surface 314 about the perimeter of ergonomic hand support section 210. Region 317 of perimeter surface 316 is a control surface that has the external control points described above. A point of contract between cursor control section 201 and control surface 317 defines an external control point for the first field of motion. Hence, control surface 317, between finger and thumb support regions 222, 224, has one or more control points that confine the range of movement of cursor control section 201 in the first field of motion. Alternately, discrete projections can be placed on control surface 317 to define a plurality of control points.

As just described, little-finger support region 222 and thumb support region 224 extend substantially in the Y-direction from palm support region 220, and define opening 218. In this embodiment, opening 218 extends from a second side of thumb support region 224 to a second side of little-finger support region 222. Opening 218 is positioned between regions 222 and 224. Hence, regions 222 and 224 are positioned not only to provide the ergonomic features described above but also are positioned to define opening 218 so that computer mouse 201 can be moved within opening 218.

Opening 218 (FIG. 2A) frames head portion 201A of cursor control section 201. In general when external control points are needed, the shape of opening 218 is selected to approximately mirror the shape of cursor control section 201. Unlike prior art device 110 that fit snugly about computer mouse 112, opening 218 is larger than cursor control section 201 so that there is a limited range of motion within opening 218. Since the shape of opening 218 is selected to provide this limited range of motion, the shape of opening 218 may not be an exact mirror image of cursor control section 201. In addition, opening 218 is always selected so that a proper relationship is maintained between the two sections of device 200.

As described above, when the user makes fine cursor movements, the user keeps ergonomic hand support section 210 stationary, and utilizes the fingers, the hand, and the wrist to move cursor control section 201. When the user moves cursor control section 201 so much that section 201 knocks against one of the control points, either internal or external, the collision alerts the user that the range of fine movement is reached and the user must employ a second field of motion to move device 200 further in that direction.

In this manner, ergonomic dual-section computer-pointing device 200 inhibits excessive side-to-side bending of the user's wrist. As explained above, the user typically keeps ergonomic hand support section 210 stationary when making movements in the first field of motion. Of course, in some situations, it is possible for the user to move ergonomic hand support section 210 slightly to make fine cursor movements as well.

When the cursor controlled by movement of cursor control section 201 must be moved further than is permitted within the first field of motion, the user grasps cursor control section 201, and effortlessly slides the combination of ergonomic hand support section 210 and cursor control section 201 around the work surface.

Figure 6:
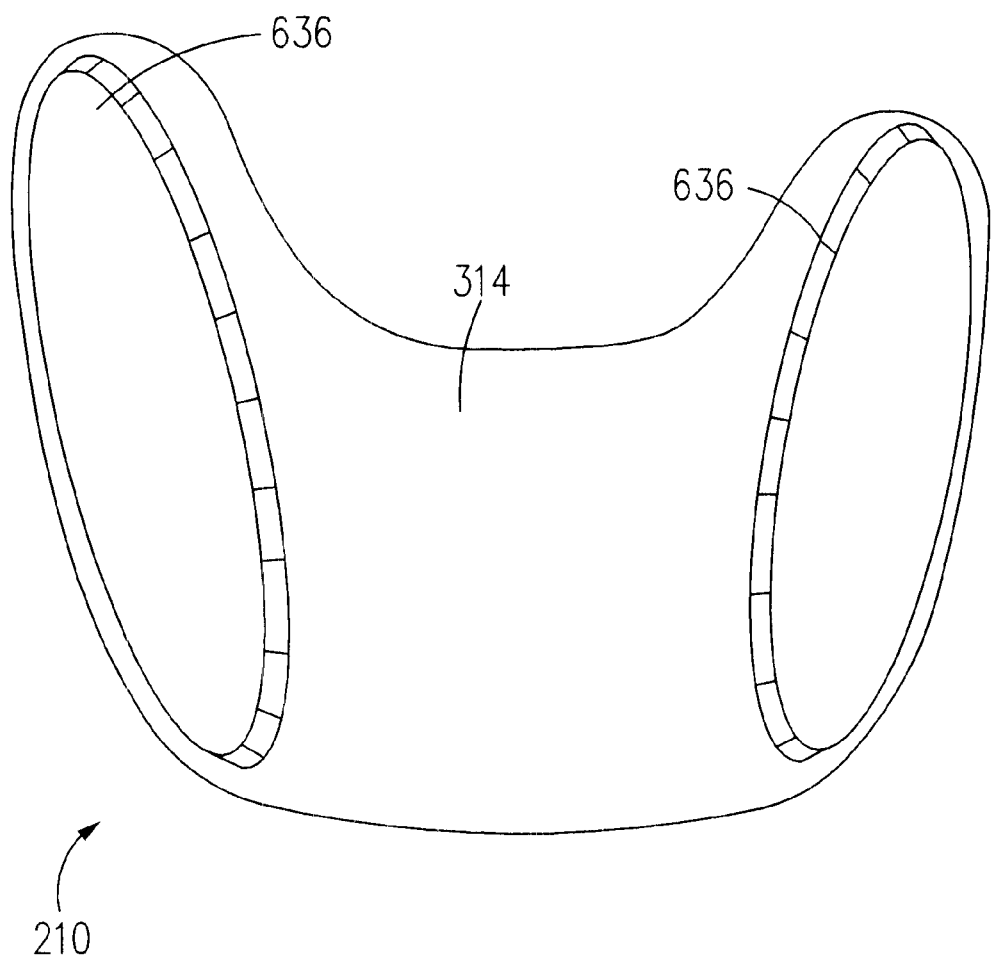
FIG. 6 is a bottom view of one embodiment of the ergonomic hand support section of this invention.

In this embodiment, ergonomic hand support section 210 has a plurality of rails 636 affixed to, or made integral with second surface 314. See FIG. 6. Plurality of rails 636' facilitates movement of device 200 in the second field of motion. Cursor control section 201 has a single rail, or a plurality of rails on bottom 303 of bottom cursor control section 302 positioned to facilitate moving control section on and off a work surface. The user grasps computer mouse 201, and effortlessly slides ergonomic dual-section computer-pointing device 200 on plurality of rails 636 around the work surface. Plurality of rails 636 permits smooth movement of ergonomic dual-section computer-pointing device 200 near the edges of work surface, because none of the plurality of rails catches on the edges. Thus, if ergonomic dual-section computer-pointing device 200 should slide off any edge of the work surface, the user merely slides ergonomic dual-section computer-pointing device 200 back unto work surface without interruption of the motion of device 200.

While in the embodiment described above, ergonomic dual-section computer-pointing device 200 is supported by a plurality rails, this is illustrative only and is not intended to limit the invention to rail support only. Bottom surfaces 314 and 303 can be a flat, hard surface with beveled edge surfaces around the perimeter of bottom surface 314 and 303. Bottom surface 314 and bottom surface 303 can also be supported by other sliding means such as wheels, rollers, or small pads.

With ergonomic dual-section computer-pointing device 200, the user utilizes the user's arm and shoulder to move both cursor control section 201 and ergonomic hand support section 210 in unison when making coarse cursor movements. The coarse movement of cursor control section 201 causes the cursor, on the computer visual display, to move to the desired position.

Ergonomic dual-section computer-pointing device 200 trains the computer user to employ two fields of motion in manipulating cursor control section 201. Consequently, ergonomic dual-section computer-pointing device 200 reduces stress and risk of injuries from repetitive motions by encouraging the user of device 200 to employ two fields of motion to control the device.

As explained above, in the first field of motion, ergonomic dual-section computer-pointing device 200 remains stationary, and the computer user uses hand and wrist motion in making fine cursor movements. In the second field of motion, the computer user uses arm and shoulder motion to move both cursor control section 201 and ergonomic hand support section 210 in unison for coarse cursor movements.

With the combined use of the two fields of motion, ergonomic dual-section computer-pointing device 200 advantageously causes the user to distribute the workload evenly across the fingers, hand, the wrist, the arm and the shoulder when manipulating cursor control section 201. As a result, the user is afforded small rest breaks in the arm and shoulder areas when the fingers, hand and wrist are used to make fine cursor adjustments. Conversely, the user is afforded small rest breaks in the hand area including the fingers and wrist, when the arm and shoulder are utilized to make coarse cursor movements. This coupled with the audio warning system provides a new level of ergonomic performance.

When ergonomic dual-section computer-pointing device 200 is constructed from separate parts, it is understood that the parts can be connected together in manners known to those skilled in the art, including mechanical locking arrangement, glue, or other fastening materials. It is further understood that when ergonomic dual-section computer-pointing device 200 is made of a top-base construction, the top piece may be held to the base by means of gravity without having the top piece permanently attached to the base.

Ergonomic dual-section computer-pointing device 200 can be manufactured using wood, metal, plastic, rubber, or any other solid material. Ergonomic dual-section computer-pointing device 200 can be manufactured using techniques known to those skilled in the art, including injection molding, thermoforming, hand carving, milling technique, and other methods of fabricating plastics and rubber compounds such as room temperature vulcanizing.

In the two piece embodiment and in general, top surface 212 of section 310 of ergonomic hand support section 210 is a soft-top surface. The soft-top surface is constructed using any soft material such as foam rubber, fabric, plastic, or wood, or a combination of soft and hard materials. In an alternate embodiment, top surface 212 can be a hard surface constructed of hard material such as plastic or rubber. In yet another embodiment, top surface 212 can be a top surface of a volume filled with liquid or a gas such as air.

In one embodiment, top surface 212 has a smooth surface. In the embodiment shown in FIG. 2A, top surface 212 of ergonomic dual-section computer-pointing device 200 has a textured surface. The textured surface can extend the entire surface area of top surface 212 or it can be limited to a portion of top surface 212. Various textural designs are suitable for the textured surface, including diamond shaped pattern, circles, lines, dotted squares, and other patterns. The textured surface is provided to eliminate the discomfort associated with perspiration of the hand while using ergonomic dual-section computer-pointing device 200.

A more detailed description of features of an ergonomic hand support section that can be used for ergonomic hand support section 210 are described in commonly assigned U.S. patent application Ser. No. 08/912,277, entitled "AN ERGONOMIC HAND SUPPORT FOR A COMPUTER POINTING DEVICE," of William P. Hesley, filed on Aug. 15, 1997, which is incorporated herein by reference in it entirety.

Although the present invention has been described with reference to one embodiment, persons skilled in the art will recognize that changes may be made in form and detail without departing from the spirit and scope of the invention. While the device presented herein is for a right-handed person, a similar device can be made for a left-handed person. In addition, the size of the device and be adjusted to accommodate the range of sizes in the human hand. It is anticipated that the device will be made in a range of sizes varying from one device for small children through another device for adults with exceptionally large hands.

We claim:

1. An ergonomic computer-pointing device comprising:
   a cursor control section wherein a cursor is controlled by movement of said cursor control section;
   an ergonomic hand support section; and
   a coupler movably and fixedly interconnecting said cursor control section and said ergonomic hand support
   wherein said cursor control section is movable relative to said ergonomic hand support section so that said cursor control section can be moved to position said cursor while said ergonomic hand support remains stationary;
   said coupler limits a separation between said cursor control section and said ergonomic hand support section to a first distance in a first direction, and so motion of said cursor contol section relative to said ergonomic hand support in said first direction is limited to a maximum of said first distance that in turns limits a range of cursor motion obtained by motion of said cursor control section while said ergonomic hand support remains stationary and, a pressure timing circuit coupled to ergonomic hand support section wherein the pressure timing circuit measures an amount of time a user maintains pressure on the ergonomic hand support section and generates a time-out signal when the amount of time exceeds a predefined time and further wherein the pressure timing circuit generates a warning to the user, in respond to the time-out signal, to adjust a hand of the user with respect to the ergonomic hand support section and thereby relieves said pressure.

2. The ergonomic computer-pointing device of claim 1 wherein said coupler permits free movement of said cursor control section over a first field of motion; and said coupler limits a range of motion in said first direction in said first field of motion.

3. The ergonomic computer-pointing device of claim 2 wherein said ergonomic hand support section includes a control surface, and a combination of said control surface and said coupler limit ranges of motion in said first field of motion.

4. The ergonomic computer-pointing device of claim 2 wherein said coupler includes an internal surface that bounds a cam opening oriented about a crash stop wherein a size of said cam opening and a size of said crash stop determine a range of motion in said first field of motion.

5. The ergonomic computer-pointing device of claim 1 wherein said coupler is a telescoping mechanism pivotally connected to said cursor control section and pivotally connected to said ergonomic hand support section.

6. The ergonomic computer-pointing device of claim 5 further comprising a set of crash stops mounted in said ergonomic hand support section about said telescoping mechanism to limit movement of said telescoping mechanism.

7. The ergonomic computer-pointing device of claim 5 further comprising a set of crash stops mounted in said cursor control section about said telescoping mechanism to limit movement of said telescoping mechanism.

8. An ergonomic computer-pointing device comprising:
a cursor control section wherein a cursor is controlled by movement of said cursor control section;
an ergonomic hand support section having:
a palm support region;
a little-finger support region extending from said palm support region; and
a thumb support region extending from said palm support region;
a coupler movably and fixedly interconnecting said cursor control section and said ergonomic hand support,
wherein said cursor control section is movable relative to said ergonomic hand support section so that said cursor control section can be moved to position said cursor while said ergonomic hand support remains stationary;
said coupler limits a separation between said cursor control section and said ergonomic hand support section to a first distance in a first direction, and so motion of said cursor control section relative to said ergonomic hand support in said first direction is limited to a maximum of said first distance that in turns limits a range of cursor motion obtained by motion of said cursor control section while said ergonomic hand support remains stationary and, a pressure timing circuit coupled to ergonomic hand support section wherein the pressure timing circuit measures an amount of time a user maintains pressure on the ergonomic hand support section and generates a time-out signal when the amount of time exceeds a predefined time and further wherein the pressure timing circuit generates a warning to the user, in respond to the time-out signal, to adjust a hand of the user with respect to the ergonomic hand support section and thereby relieve said pressure.

9. The ergonomic computer-pointing device of claim 8 wherein said coupler permits free movement of said cursor control section over a first field of motion while said ergonomic hand support section remains substantially stationery.

10. The ergonomic computer-pointing device of claim 8 wherein said palm support region has a slope in a direction from said little-finger support region to said thumb support region.

11. The ergonomic computer-pointing device of claim 10 further comprising:
a front index extending from a portion of said palm support region between said little-finger support region and said thumb support region.

12. The ergonomic computer-pointing device of claim 11 further comprising:
a side index extending from said thumb support region and said palm support region.

13. The ergonomic computer-pointing device of claim 8 further comprising:
a front index extending from a portion of said palm support region between said little-finger support region and said thumb support region.

14. The ergonomic computer-pointing device of claim 13 further comprising:
a side index extending from said thumb support region and said palm support region.

15. The ergonomic computer-pointing device of claim 13 further comprising:
a pressure relief edge surface extending from a portion of said palm support region opposite and removed from said front index.

16. The ergonomic computer-pointing device of claim 8 further comprising:
a side index extending from said thumb support region and said palm support region.

17. The ergonomic computer-pointing device of claim 8 wherein a part of said palm support region is textured.

18. An ergonomic computer-pointing device comprising:
a cursor control section wherein a cursor is controlled by movement of said cursor control section;
an ergonomic hand support section movably and fixedly coupled to said cursor control section wherein said cursor control section is movable relative to said ergonomic hand support section so that said cursor control section can be moved to position said cursor while said ergonomic hand support remains stationary; and
a pressure timing circuit coupled to said ergonomic hand support section wherein said pressure timing circuit measures an amount of time a user maintains pressure on said ergonomic hand support section and generates a time-out signal when said amount of time exceeds a predefined time and further wherein said pressure timing circuit generates a warning to said user, in response to said time-out signal, to adjust a hand of said user with respect to said ergonomic hand support section and thereby relieve said pressure.

* * * * *